United States Patent

Watanabe et al.

[15] 3,640,806

[45] Feb. 8, 1972

[54] SEMICONDUCTOR DEVICE AND METHOD OF PRODUCING THE SAME

[72] Inventors: Yoshio Watanabe; Tetsushi Sakai, both of Tokyo, Japan

[73] Assignee: Nippon Telegraph and Telephone Public Corporation, Tokyo, Japan

[22] Filed: Jan. 5, 1970

[21] Appl. No.: 597

[52] U.S. Cl. ........................................204/143 GE, 204/32 S
[51] Int. Cl. ........................................C23g 3/00, B23p 1/00
[58] Field of Search ..................................204/143 GE, 32 S

[56] References Cited

UNITED STATES PATENTS 2,755,238 7/1956 Turner....................................204/33

OTHER PUBLICATIONS

Chem. Abs. Vol. 65, 1757d, 1966

*Primary Examiner*—John H. Mack
*Assistant Examiner*—R. J. Fay
*Attorney*—Pierce, Scheffler & Parker

[57] ABSTRACT

A semiconductor device and a method of producing the same. The semiconductor device comprises a silicon single crystal including a porous substance formed so as to advance from surface area toward inside area of said silicon single crystal. The porous substance is produced on the silicon single crystal by utilizing said crystal and a conductive metal material which is not soluble to hydrofluoric acid as electrodes, applying a positive direct current voltage to the silicon single crystal and a negative direct current voltage to the other metal electrode, and carrying out an electrolysis in an aqueous solution of the hydrofluoric acid.

4 Claims, 36 Drawing Figures

INVENTORS
Yoshio Watanabe
Tetsushi Sakai
BY
Pierce, Scheffler & Parker
ATTORNEYS INVENTORS
Yoshio Watanabe
Tetsushi Sakai
BY
Pierce, Scheffler & Parker
ATTORNEYS INVENTORS
Yoshio Watanabe
Tetsushi Sakai
BY
Pierce, Scheffler & Parker
ATTORNEYS

SEMICONDUCTOR DEVICE AND METHOD OF PRODUCING THE SAME

This invention relates to a device in which a porous substance is formed in semiconductor, specifically in silicon crystal by means of an electrolytic operation in an aqueous solution of hydrofluoric acid, and to a method of producing such device.

Conventional methods for producing insulators as contained in semiconductor parts will be classified principally into such two types as follows, except the ones for thin film integrated circuits using an insulator as a substrate.

One of them will be the method of having semiconductor crystals themselves varied into an insulator by means of such a chemical reaction as thermal oxidation at a higher temperature or anodic oxidation of silicon. The other one will be such the method of depositing the insulator on the semiconductor crystal as vacuum evaporation or vapor phase reactions.

While the method of varying the semiconductors themselves into an insulator by means of a chemical reaction is easy to carry out and effective in general in obtaining a good insulation characteristic, however, it is difficult in the case where the insulator is formed in a film to make the thickness of the film larger. In the case of, for example, utilizing thermal oxidation of silicon crystal, a heating at a temperature higher than 1,100° C. for several hours is required in order to form an oxide film of 2$\mu$ thick. Further, even when the oxide film of 2$\mu$ thick is formed by means of the above method, the film will inherently have cracks on it so that the film will become useless.

In the case of the anodic oxidation, on the other hand, the thicker the oxide film becomes, the harder the electric current flows. In order to maintain the electric current to be constant, formation voltage will have to be increased, but if the voltage is increased to an excess value, a dielectric breakdown will be caused to occur and, thus, the film thickness will be no more increased. Since growth rate of the oxide film is proportional to the electric current, it is known that there is a limit in the thickness of oxide film formed by the anodic oxidation. It is almost impossible, for this reason, to obtain the film of 1$\mu$ thick.

Generally, the silicon has such a character that its solid measurement will increase at the time when the same is oxidized. It is known, in this connection, that the thickness of oxide film of the silicon formed by such method as above will become more than two times of that of silicon layer practically reacted. Therefore, if the silicon layer in an extent from the surface to a depth of 1$\mu$ inside is oxidized, then the oxide film of the silicon will be of more than 2$\mu$ thick. Since, as set forth in the foregoing, it is practically difficult to obtain an oxide film of more than 2$\mu$ thick, it is naturally difficult to have the silicon layer from the surface to a depth of 1$\mu$ varied into an insulative material.

According to the method of depositing insulator on the semiconductor crystal, on the other hand, the film thickness can be increased to a thickness of more than 2$\mu$ by way of increasing deposition rate and time. However, this method occasionally produces cracks on the film, and its process are somewhat more complicated than those in the case of the former method. Further, there will be produced a step at boundary line between the area of semiconductor crystal on which the insulator is deposited and the other area on which no deposition is produced. This step will become larger when the deposited film thickness is larger and, thus, it is possible that there will be caused a certain trouble to occur at the time of subsequent interconnection of electrodes or the like.

The method of producing the insulator layer according to the present invention may be classified in the aforementioned type of method in which the semiconductor crystal itself is varied into an insulator. However, the method according to the present invention is specifically excellent in that a bulk silicon crystal can be varied from its surface into any desired depth, as compared with ordinary method of thermal oxidation or anodic oxidation.

The present invention is greatly featured in providing a new technique to the art of utilizing the semiconductor crystal, which technique is established by varying a predetermined portion of the semiconductor crystal into a porous substance and utilizing inherent features of this porous substance.

Specifically it should be noted that the technique of varying the predetermined portion of semiconductor crystal into an insulator from the surface into a deep portion of the crystal shows a high merit in the application to manufacturings of such semiconductor devices as integrated circuits, transistors and the like.

Utilizing further the fact that the above porous substance dissolves to aqueous solutions of hydrofluoric acid, nitric acid mixture at a remarkably high rate, the method of the present invention can be utilized in forming mesa-type semiconductors. It is also possible to obtain a semiconductor device which has a flat surface and contains impurities diffused into considerably a deep area of any selective depth as diffused through the porous substance layer.

Stating in other words, the most important point of the present invention resides in that the semiconductor crystal is varied into the porous substance. This variation of the crystal is performed by way of an anodic treatment carried out in an electrolytic solution. For the electrolytic solution, the aqueous solution of hydrofluoric acid or an aqueous solution consisting mainly of the aqueous solution of hydrofluoric acid is used. That is, it is admissible that a certain amount of other substances are mixed in the solution, as far as required action of the aqueous solution of hydrofluoric acid is maintained. As for anode (the electrode to which a positive voltage is applied), a material semiconductor crystal itself is used and, as for cathode (the electrode to which a negative voltage is applied), a conductive member of such an acid-proof material as platinum or the like is used. When a DC voltage is applied to these electrodes, an electrode reaction is caused to occur and the material semiconductor crystal is made to gradually vary from its surface toward inside into the porous substance layer.

As has been disclosed in the foregoing, the electrolytic solution contains as its main ingredient the hydrofluoric acid. In this connection, it should be here noted that the concentration of this main ingredient is desired to be higher. This is for the reason that, in the case of the higher concentration, the electric voltage required for flowing the same amount of electric current as in the case of a lower concentration can be made smaller.

In order to perform the desired formation of the porous layer according to the present invention, a concentration of more than 10 percent is required. Even in the case of a lower concentration than 10 percent, the porous substance may be formed by setting the voltage at a smaller value. However, its formation rate is small, it is difficult to obtain a thick film, and, therefore, such solution of a lower concentration as above cannot be used in practice. If the concentration of hydrofluoric acid would be about 3 percent, it would be possible that an electrolytic polishing could be carried out with an application of the electric voltage larger than 2 v., with which the porous substance would be able to be formed in the case of the concentration of more than 10 percent. However, the film thickness of such a porous substance layer as formed with a lower voltage applied in the case of the above concentration would be less than 1$\mu$, which should be deemed to be remarkably thin.

Current density will vary after the reaction is initiated. However, it is considered that the current density will not decrease depending on increase of the film thickness as in the case of anodic oxidation and that electrical resistance of the porous substance to be formed will be small in the electrolytic solution. Here, it is desirable to set the current density to be less than 5 ma./mm.$^2$, since, if the current density is increased to a higher value than the above, there will be caused an unevenness on the surface of the formed porous substance, which is not desirable.

In the above connection, it should be noted that, in the case when these electrode reactions are desired to be applied to a predetermined portion of the semiconductor substrate, other surface area where no porous substance layer is required to be formed should be covered preliminarily with such an insulative material which is not readily soluble to the hydrofluoric acid as an acid-resisting wax, a silicon nitride film or the like. In the present instance, it is considered that the use of silicon nitride film is more advantageous since a selective etching of the silicon nitride film can be carried out with a high accuracy by using hot phosphoric acid.

The porous substance thus formed at a predetermined position of the semiconductor substrate will become an insulator as oxidized by being heated in an oxygen atmosphere. The porous substance will be quickly dissolved by the mixture of an aqueous solution of the hydrofluoric acid and nitric acid as dipped therein so as to be readily removed. When other features of the materials are effectively utilized, the present invention should be advantageously applicable to works on various parts.

A principal object of the present invention is, therefore, to form an insulator in the semiconductor crystal up to a considerable depth.

Another object of the present invention is to provide a semiconductor device which is easy to form electrodes thereon due to the feature that both surfacial planes of the insulator and semiconductor crystal are existing substantially on the same plane.

A further object of he present invention is to develop manufacturing techniques at the time of such manufacturing operations of the semiconductor crystal for adapting the same to be those parts of electric equipments as the diffusion of impurities into the crystal through the porous substance layer, the removal of this porous substance by means of the etching and the like.

Other objects and advantages of the present invention shall be made clear by reading the following detailed disclosures of the invention to be set forth with reference to the accompanying drawings in which:

FIGS. 4A through 4E show another embodiment of the method similar to that of FIG. 3;

FIGS. 5A through 5E show a further embodiment similar to that of FIG. 3;

Figures 1A, 1B, 1C, 1D, 1E, 1F, 1G, 2, 3A, 3B, 3C, 3D, 3E:
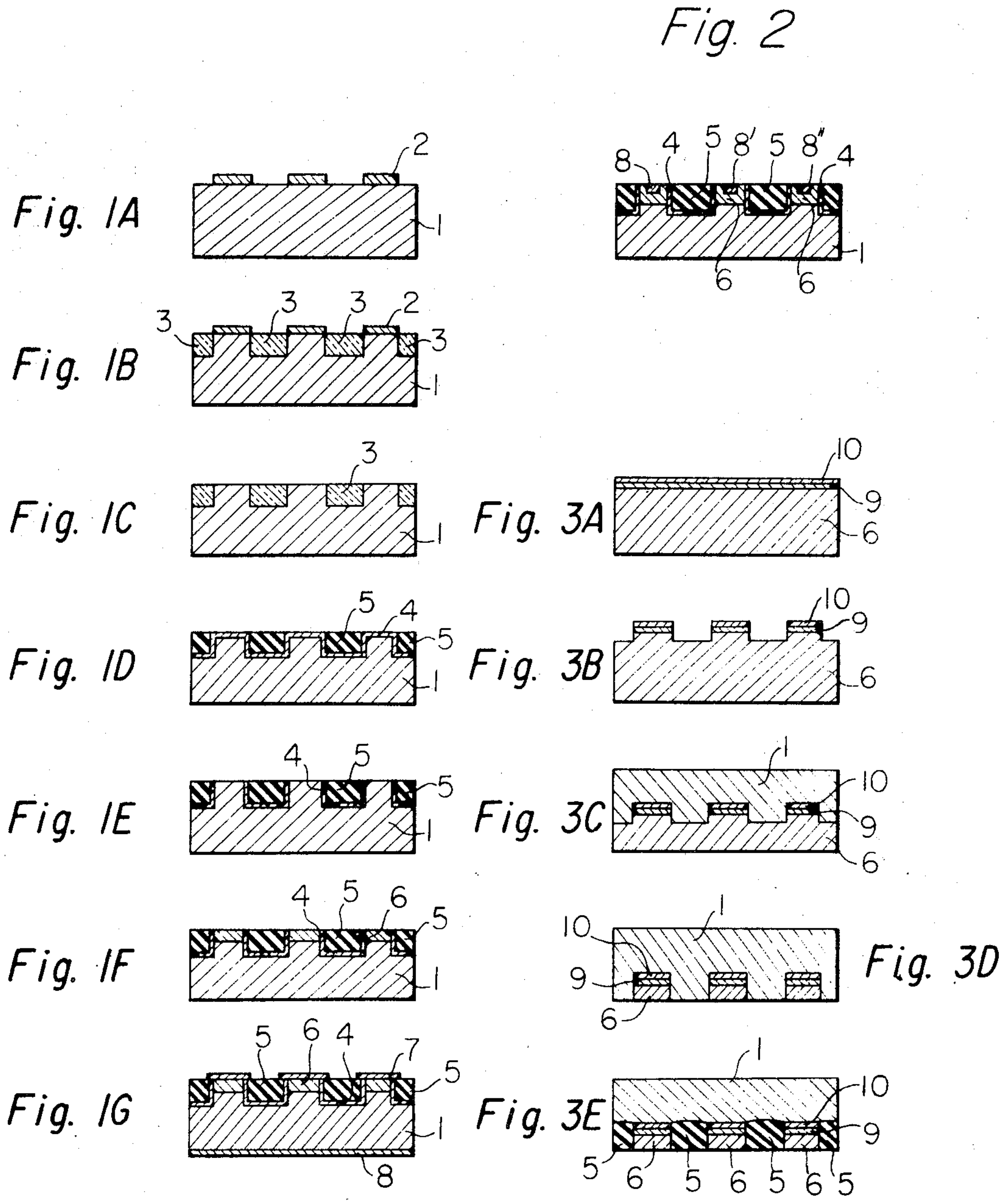
FIGS. 1A through 1G show respective steps of an embodiment of the method of producing a semiconductor device according to the present invention as applied to manufacturing of a diode.
FIG. 2 shows an embodiment of the semiconductor device according to the present invention as applied to the integrated circuit.
FIGS. 3A through 3E show respective steps of an embodiment of the method according to the present invention as applied to element isolation in the integrated circuit.
Figure 4A:
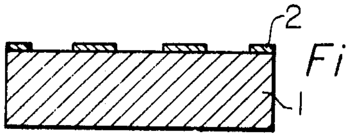
Figure 5A:
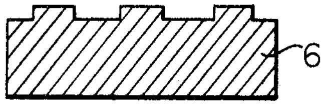
Figure 4B:
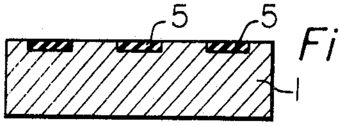
Figure 5B:
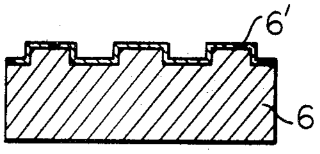
Figure 5B:
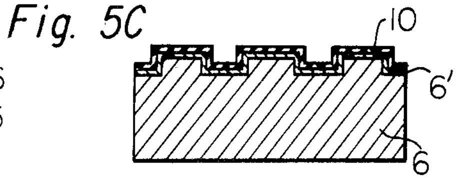
Figure 4C:
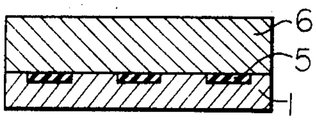
Figure 4C:
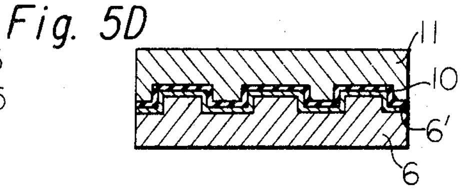
Figure 4D:
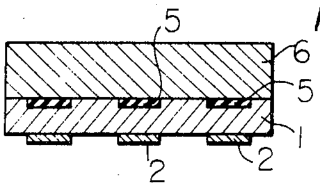
Figure 4D:
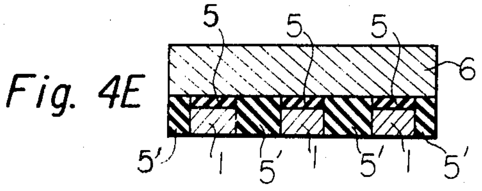
Figure 5E:
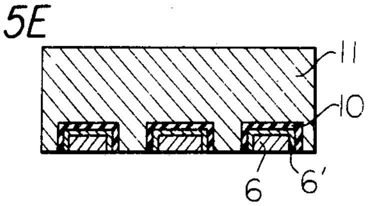

FIGS. 6A through 6H shown respective steps of an embodiment of the method according to the present invention as applied to a manufacturing of transistor; and FIGS. 7A through 7E show respective steps of another embodiment of the method similar to that of FIG. 6.

While the present invention shall now be disclosed in detail with reference to the illustrated embodiments of the invention, it should be understood that the intention of the disclosure is not to limit the present invention to the particular embodiments, but to rather cover all of possible modifications, alterations and equivalent arrangements to be included in the scope of the invention as defined in the appended claim.

Referring now to the drawings, there is shown in FIG. 1 an embodiment of manufacturing steps of diode according to the present invention.

As shown in FIGS. 1A and 1B, after one of the surfaces of a P-type semiconductor silicon substrate 1 (of 0.5Ω-cm.) is polished to a mirror surface by a treatment with such a smoothing or polishing liquid as a mixture of the hydrofluoric acid and nitric acid, or the like, a silicon nitride film 2 of a diameter 1 mm.$\phi$ is formed on the surface in a plurality of circular island shapes. With respect to this silicon substrate 1 having such island-shape silicon nitride film 2, the aforementioned electrolytic operation is then carried out in 46 percent aqueous solution of hydrofluoric acid, which is available in the market, at a room temperature for 2 minutes. Current density at this time is about 2 m./mm$^2$. Thus, a porous layer 3 of about 5$\mu$ deep is formed. Since the part coated with the silicon nitride film 2 does not react, a semiconductor crystal part of 5$\mu$ high is left in a mesa type in the porous layer 3.

Then, the silicon nitride film 2 is removed, as shown in FIG. 1C, by dipping the above silicon plate 1 of FIG. 1B in a hot phosphoric acid. When this material silicon plate 1 is heated at 1,150° C. for 30 minutes in a wet $O_2$ atmosphere, the porous substance layer 3 is oxidized so as to become an insulator layer 5. At this time, a thin oxidized film layer 4 is formed also on the surface of semiconductor crystal. This state is shown in FIG. 1D. In the drawing, 4 is the oxidized film formed on the surface of semiconductor crystal, and 5 is the insulator layer produced as said porous substance layer is oxidized. The oxidized film layer 4 produced in the crystal part of material surface is then removed by way of a mechanical polishing (FIG. 1E). Subsequently a diffusion of phosphorous is effected with respect to the P-type silicon plate 1 by way of vapor phase method, so that P-N junction is formed in the mesa-type part. This state is shown in FIG. 1F. Here, 6 shows N-type silicon and 1 shows P-type silicon. Since semiconductor crystal part other than the part exposed at the surface of the mesa part is coated with the oxidized film 4, the junction part will be as shown in FIG. 1F. Thus obtained material is then treated by way of vacuum evaporation of aluminum and, consequently, metal electrodes 7 and 8 of aluminum are formed on respective surfaces of N-type silicon and P-type silicon. This state is shown in FIG. 1G.

It should be here appreciated that a mesa-type diode having flat surfaces is produced through the above steps. As will be seen clearly in FIG. 1G, thus produced diode has respective features of both of mesa-type and planer-type diodes. That is, the formation of electrodes on the silicon plate is so easy since the respective surfaces of the silicon crystal and insulator layer are located on the same plane and, further, the thus obtained diode has a higher breakdown voltage since the P-N junction is flat.

Breakdown voltage of the above diode is about 23 v. which shows that the diode has a breakdown voltage of a larger value than that of those well-known planar-type P-N junction in general.

A comparison of physical characteristics of the porous substance and insulator layer produced as disclosed in the above according to the present invention with those of the substrate silicon semiconductor crystal will be shown in the following table 1.

TABLE 1

Physical Characteristics of Silicon Single Crystal, Porous Substance & Porous Insulator Substance

| | A | B | C |
|---|---|---|---|
| Electric Resistance | 2.9Ω-cm. | $3.8\times10^9$Ω-cm. | $3.8\times10^9<<$Ω-cm. |
| Specific Dielectric Constant | 11 | 2.6 | 1.4 |
| Specific Gravity | 2.33 | 0.95 | — |

Wherein:

A. P-type silicon single crystal (Epitaxial Wafer).

B. Porous substance produced according to the present invention on the surface of the above P-type silicon, in 50 percent aqueous solution of hydrofluoric acid, with electric voltage of 3 v. applied for 7 minutes.

C. Porous insulator produced by heating the above porous substance in wet $O_2$, at 1,100° C. for 30 minutes.

Further, a result of microscopic observation of the products according to the present invention is shown in the attached photographs I and II.

Photograph I is an electron-microscopic view (x10.000) of the surface of the porous substance, and shows a state of hole produced on the surface.

Photograph II shows with an angle lapping the internal state of the porous insulator produced by varying, according to the method of the present invention, predetermined portions of the silicon crystal. In the photograph, part 1 shows the surface of angle lapping, part 2 shows evaporated aluminum film formed on the substrate silicon surface, part 3 shows oxidized silicon film formed on the substrate silicon surface, part 4 shows porous insulator, and part 5 shows crossing position of the inclined polishing surface and the substrate silicon surface. Here, the depth of the porous insulator is about $15\mu$.

Since according to the present invention it is possible to form the insulator layer up to a deeper extent into the semiconductor crystal than in the cases of conventional methods, it is considered that the present invention can be applicable to manufacturings of new types of integrated circuits, transistors and the like.

FIG. 2 shows an embodiment of the present invention as applied to an isolation in an integrated circuit.

In the drawings, 8, 8' and 8'' are respective single elements, 5 is a layer of porous insulator, 4 is an oxidized film formed on semiconductor surface, 6 is an N-type semiconductor, and 1 is a P-type semiconductor. It may be possible to consider that the insulator layer is the one formed, in place of the one formed by the diffusion for isolation which has been conventionally carried out.

FIG. 3 is a schematic view showing respective steps of the method according to the present invention as applied to the isolation between respective elements in an integrated circuit.

In the drawing, 6 is an N-type silicon, 9 is an N+ layer as formed on the surface of the N-type silicon, and 10 is a film of porous insulator (Step A shown in FIG. 3A).

Next, a mesa is formed on the surface treated in the foregoing step A, by way of an etching process or the like with a mask of such a film of the silicon nitride film, a wax or the like as the ones that are not corrosive to the hydrofluoric acid, nitric acid and the like (Step B in FIG. 3B). Subsequently, through step C in FIG. 3C, the P-type silicon layer 1 is formed so as to be of a thickness from several to several hundred microns on the said substrate silicon 1 by means of epitaxial growth process, and then, through step D, the N-type silicon 6 is removed by way of the polishing up to the level where bottoms of each mesa are exposed. Last, only bottom part of the P-type silicon 1 exposed simultaneously through the step D is processed by the method according to the present invention so that the porous insulator layer 5 will be formed up to the said insulator film 10 (Step E in FIG. 3E). In this case, the P-type silicon does not require any masking since the same can be made to be porous much easier than the N-type silicon.

Through the above-mentioned steps, the respective forming areas of the semiconductor element 6 can be completely insulated and isolated from each other by means of the porous insulator film 10 and layer 5. It should be understood that the aforementioned insulator film 10 may be formed of a silicon nitride film or a silicon dioxide film, which performs the same effects.

FIG. 4 shows another example of the present invention as applied to the isolation of the respective elements in an integrated circuit. In the first step A of FIG. 4A, a silicon film is formed on the P-type silicon nitride substrate 1, and said film is then partially removed by means of a photoetching. Remaining silicin nitride film is shown by the reference numeral 2. Then, thus exposed surface area of silicon substrate 1 is processed by the method of the present invention, so that the porous insulator film 5 will be formed, after which said silicon nitride film 2 is removed (Step B in FIG. 4B). Through a step C in FIG. 4C next, a $P^+$-type silicon layer 6 of a several $100\mu$ is formed by way of an epitaxial growth process and, subsequently, the silicon substrate 1 is made to be of a thickness of about $10\mu$ by means of a polishing. Then, a silicon nitride film is formed on the bottom surface of the silicon 1 and the film except those portions opposing to the porous insulator film 5 is removed by way of a photoetching (Step D in FIG. 4D). Remaining silicon nitride film is shown at 2 therein. Then, only those portions of the silicon substrate 1 exposed out of he silicon nitride film 2 (portions not covered by the film 2) is processes by the method of the present invention, so that the porous insulator layer 5' will be produced up to the level the silicon 1 is penetrated through (that is, up to the level where the P-type silicon 6 is reached). Then after, the silicon nitride film 2 is removed (Step E in FIG. 4E).

Through the above steps, the resultant semiconductor element forming areas 1 are completely isolated from each other by means of the porous insulator film 5 and layer 5'.

FIG. 5 shows another example of the present invention as applied to the isolation of respective elements in the integrated circuit. Its difference from the foregoing method is in that a number of mesa-type portions is formed from the very first of the steps on the silicon substrate 6. That is, a number of mesa of about 10 to several $10\mu$ high is formed on the N-type silicon wafer 6 with an etching process, selective epitaxial growth process or the like (Step A as shown in FIG. 5A). Then, through a step B of FIG. 5B, an $N^+$ silicon layer 6' of about several $\mu$ to several $10\mu$ thick is formed on said silicon wafer 6 by way of an epitaxial growth process, after which the above $N^+$ silicon layer 6' is partially processed with the method already set forth of the present invention, so that the layer will be varied to a porous insulator film 10 up to a depth of several $\mu$ to several $10\mu$ (Step C as in FIG. 5C). In the next step D as shown in FIG. 5D, a polycrystal silicon layer 11 of several $100\mu$ is formed over said porous insulator film 10 by way of an epitaxial growth process. Then after, the silicon wafer 6 is removed while leaving the mesa sections by means of a polishing (Step E as in FIG. 5E). Through the above steps, resultant semiconductor element forming areas 6 are respectively completely isolated from each other by means of the porous insulator film 10.

Certain embodiments of the method according to the present invention as applied to the manufacturing process of transistors shall now be referred to in the following.

FIG. 6 shows an exemplary one of the above embodiments which is utilizing an epitaxial wafer of P-type silicon.

Figure 6A:
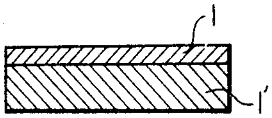
Figure 6B:
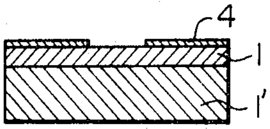
Figure 6C:
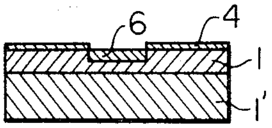
Figure 6D:
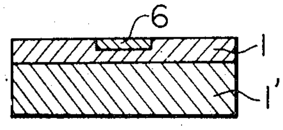
Figure 6E:
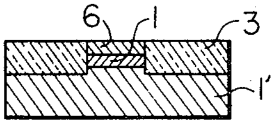
Figure 6F:
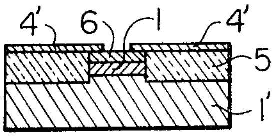
Figure 6G:
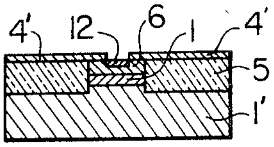
Figure 6H:
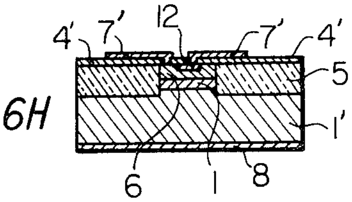

In the first step A as shown in FIG. 6A, 1 is an epitaxial layer of P-type silicon, and 1' is a wafer of $P^+$-type silicon. This material is then processed so as to be provided with an oxidized film 4 on its surface for the purpose of a diffusion mask, by way of a known photoetching process (Step B as in FIG. 6B). Then, an N-type impurity is diffused into the layer 1 by way of a vapor phase process. The part in which the impurity is diffused is shown at 6 in FIG. 6C (Step C). The oxidized film 4 on the surface is then removed (Step D of FIG. 6D) and, then, a porous substance layer 3 is formed at the part not processed with the impurity diffusion through the method according to the present invention (Step E of FIG. 6E). By utilizing a known thermal oxidation, an oxidized film 4' is formed next on the layer 3, for the purpose of the mask to be used at the time of an emitter diffusion. At this time, the porous layer 3 formed in the foregoing step is oxidized so as to become an insulator layer 5 (Step F as shown in FIG. 5F). Then, a P-type impurity is made to be diffused into the part 6 so as to form an emitter area 12 (Step G as in FIG. 6G). Lastly, the silicon dioxide film 4' is selectively removed by way of such a known process as photoetching or the like and metal electrodes 7, 7' and 8 are formed as shown in FIG. 6H, so that a transistor is produced.

Through the above steps, it is possible to produce a transistor having jointly both of respective features or mesa-type and planar-type transistors.

A further embodiment of the present invention as applied to the transistor manufacturing process shall be next referred to with reference to FIG. 7 which shows respective steps A through E.

Figure 7A:
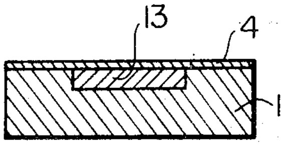
Figure 7B:
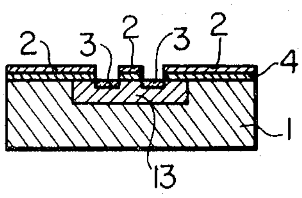
Figure 7C:
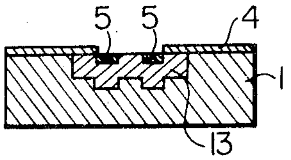
Figure 7D:
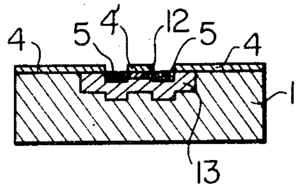
Figure 7E:
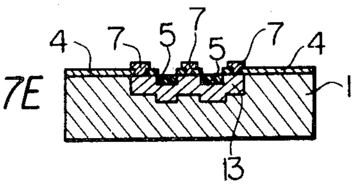

In the first step A of FIG. 7A (the state shown in this drawing is produced through the steps A to C in the embodiment of FIG. 6), an N-type impurity is diffused into a P-type silicon 1, so that a base layer 13 will be formed. Next, an oxidized film 4 is formed on its surface, and the base layer 13 is partially processed to be a porous layer 3. In this case, a silicon nitride film 2 is used as the mask (Step B of FIG. 7B). Then, a diffusion of N-type impurity, which is capable of establishing substantially the same degree of surfacial concentration as that of the surfacial concentration of the base layer 13, is carried out over the above-mentioned material of the step B, after which the porous layer 3 is varied by way of an oxidation into a porous insulator layer 5 and the silicon nitride film 2 is removed (Step C of FIG. 7C). Then, by diffusing a P-type impurity, an emitter layer 12 is formed and with an oxidation an oxidized film 4' is made to be formed on the layer 12 (Step D in FIG. 7D). Last, an electrode 7 is formed utilizing a metal evaporation and photoetching processes (Step E in FIG. 7E).

Thus, a transistor is produced through the above steps. This producing process is featured, while he porous layer and porous insulator layer are of course formed according to the method of the present invention, it is possible to perform the impurity diffusion into the base layer 13 through the porous layer 3. By utilizing such diffusion process, it is enabled to establish the diffusion of impurity from the surface of semiconducor material into considerably a deep level. As the case may be, it is even possible to form a P-N junction at a deep position in the semiconductor.

In particular, the transistor as produced according to the steps of FIG. 7 is characterized in that there is no increase in base resistance due to the emitter dip effect, and that the parasitic capacity of emitter junction is decreased.

As has been detailed in the foregoing, the present invention successfully provides a novel method of producing the semiconductor device which is remarkably effective in manufacturing of various electronic parts, specifically integrations of new-type semiconductor device and elements and the like.

What is claimed is:

1. In a method of producing a semiconductor device the step comprising converting a predetermined portion of a semiconductor crystal into a porous substance by an anodic treatment carried out in an aqueous solution of hydrofluoric acid having a concentration greater than 10 percent.

2. In a method of producing a semiconductor device the step comprising converting a predetermined portion of a semiconductor crystal into a porous substance by an anodic treatment carried out in an aqueous solution of hydrofluoric acid having a concentration greater than 10 percent and converting the porous substance into a porous insulator film through a sequential treatment after said first step.

3. In a method of producing a semiconductor device the step comprising converting a predetermined portion of a silicon crystal from its surface inwardly up to a depth of more than $1\mu$ into a porous substance by an anodic treatment carried out in an aqueous solution of hydrofluoric acid having a concentration greater than 10 percent.

4. In a method of producing a semiconductor device the step comprising converting a predetermined portion of a silicon crystal from its surface inwardly up to a depth of more than $1\mu$ into a porous substance by an anodic treatment carried out in an aqueous solution of hydrofluoric acid having a concentration greater than 10 percent and converting the porous substance into a porous insulator film through a sequential treatment after said first step.

* * * * *